US012507274B2

(12) United States Patent
Habib et al.

(10) Patent No.: US 12,507,274 B2
(45) Date of Patent: Dec. 23, 2025

(54) SYSTEMS AND METHODS FOR MANAGEMENT OF MAXIMUM SIMULTANEOUS SLICES

(71) Applicant: Verizon Patent and Licensing Inc., Basking Ridge, NJ (US)

(72) Inventors: Ambreen Habib, Golden, CO (US); Sudhakar Reddy Patil, Flower Mound, TX (US); Raquel Morera Sempere, Weehawken, NJ (US); David Taft, Keller, TX (US); Violeta Cakulev, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 535 days.

(21) Appl. No.: 18/161,580

(22) Filed: Jan. 30, 2023

(65) Prior Publication Data

US 2024/0260076 A1  Aug. 1, 2024

(51) Int. Cl.
*H04W 72/56* (2023.01)
*H04W 28/02* (2009.01)
*H04W 48/18* (2009.01)
*H04W 72/0453* (2023.01)

(52) U.S. Cl.
CPC ....... *H04W 72/56* (2023.01); *H04W 28/0215* (2013.01); *H04W 48/18* (2013.01); *H04W 72/0453* (2013.01)

(58) Field of Classification Search
None
See application file for complete search history.

(56) References Cited

U.S. PATENT DOCUMENTS

| 2020/0314701 | A1* | 10/2020 | Talebi Fard | H04W 36/08 |
| 2021/0329629 | A1* | 10/2021 | Xu | H04W 76/36 |
| 2022/0338100 | A1* | 10/2022 | Li | H04W 48/06 |
| 2022/0369204 | A1* | 11/2022 | Jeong | H04W 76/22 |
| 2023/0139546 | A1* | 5/2023 | Song | H04W 48/12 370/329 |
| 2024/0314679 | A1* | 9/2024 | Li | H04W 48/18 |

FOREIGN PATENT DOCUMENTS

WO  WO-2020035155 A1 *  2/2020  ........... H04W 76/15

\* cited by examiner

*Primary Examiner* — Jenkey Van

(57) ABSTRACT

Systems and methods described herein provide a slice management and prioritization service on a per user equipment (UE) device level. A network device in a core network may receive a notification that a UE device has exhausted a quota of available simultaneous data radio bearers (DRBs) and, afterwards, receive an indication that an application on the UE device has requested a new protocol data unit (PDU) session on a requested network slice that is not currently active for the UE device. The network device may identify relative priorities for the requested network slice and active network slices for the UE device; determine, based on the relative priorities, if the new PDU session can preempt a DRB for an active PDU session; and delete the active PDU session when it is determined the new PDU session can preempt a DRB for an active PDU session.

20 Claims, 9 Drawing Sheets

500 →

| UE Requested Slices | UE Allowed Slices | Slice Priority (1: high, 8: low) | QoS/DRB Pre-emption per PDU per Slice |
|---|---|---|---|
| Slice-1 | Slice-1 | 1 | Preemption vulnerable=N<br>Preemption capable=Y<br>Preemption priority=8 |
| Slice-2 | Slice-2 | 5 | Preemption vulnerable=Y<br>Preemption capable=Y<br>Preemption priority=3 |
| Slice-3 | Slice-3 | 7 | |
| Slice-4 | Slice-4 | 2 | |
| Slice-5 | Slice-5 | 4 | |
| Slice-6 | Slice-6 | 8 | Preemption vulnerable=Y<br>Preemption capable=N<br>Preemption priority=1 |
| Slice-7 | Slice-7 | 6 | |
| Slice-8 | Slice-8 | 3 | |
| Slice-9 | Check allowed = Y | Switch with lowest priority slice with pre-emption enabled | |

590 { (rows)

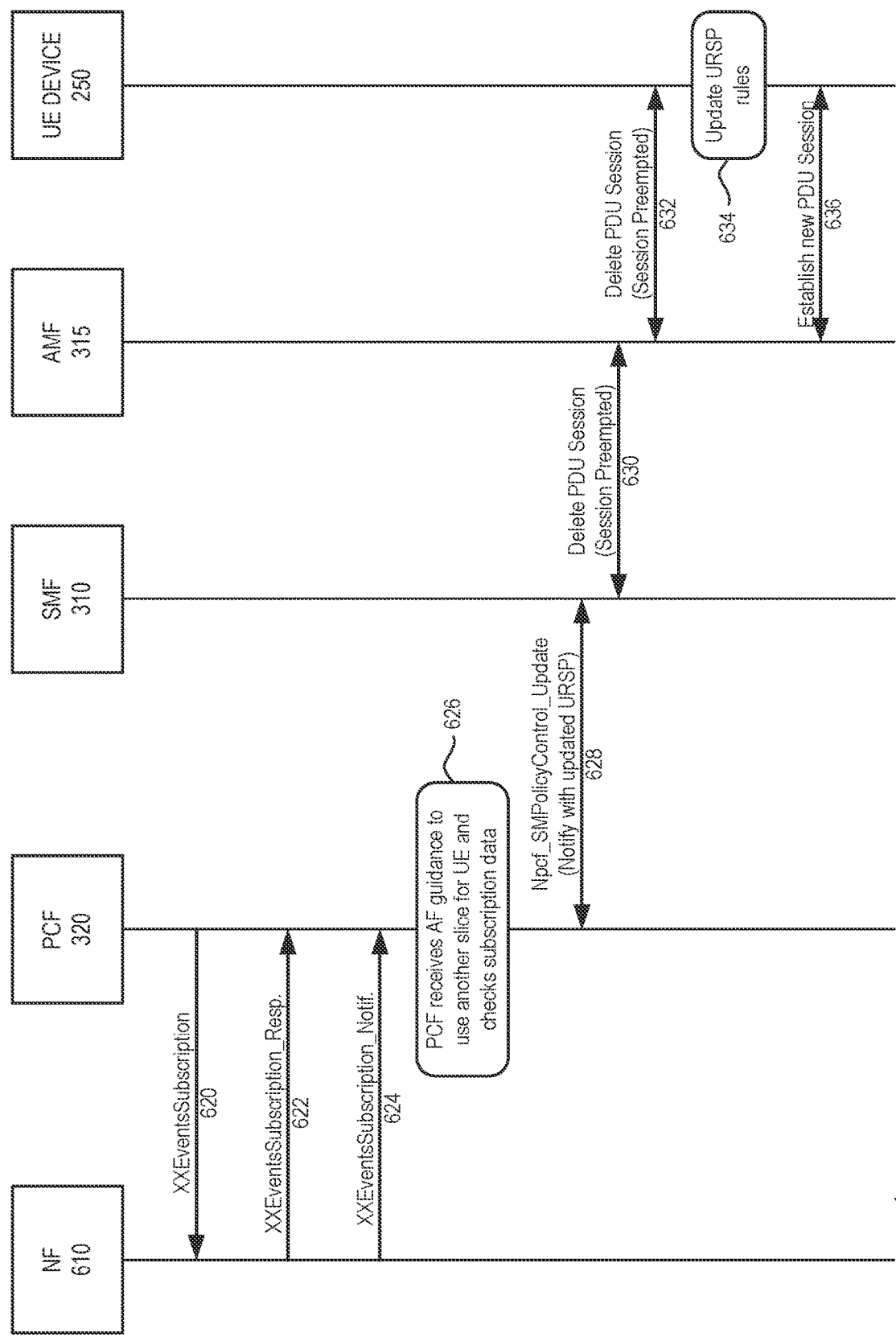

SYSTEMS AND METHODS FOR MANAGEMENT OF MAXIMUM SIMULTANEOUS SLICES

BACKGROUND

Next Generation mobile networks, such as Fifth Generation (5G) mobile networks, are being deployed as the next stage network in the evolution of mobile wireless networks. 5G mobile networks are designed to increase data transfer rates, increase spectral efficiency, improve coverage, improve capacity, and reduce latency. For example, a 5G network may incorporate network slicing technology to increase network efficiency and performance. As another example, a 5G network may provide mobile devices with the ability to use User Equipment (UE) Route Selection Policy (URSP) rules, to enable the mobile devices to access particular services.

BRIEF DESCRIPTION OF THE DRAWINGS

FIG. 5 is a table illustrating fields of a preemption policy, according to an implementation;

FIG. 6 is a diagram illustrating communications, in a portion of a network environment, to perform network monitoring and prioritization for UE device slice usage;

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

Network slicing is based on the concept of creating multiple virtual networks on a common physical infrastructure. The virtual networks can be configured to guarantee an agreed service level for specific functionality requested from different applications. Currently, a 5G network can support up to 255 different slice types (e.g., based on the current 8-bit slice service type (SST) field length) and many more slices. However, a current user equipment (UE) device can access no more than eight slices simultaneously. More particularly, there can be at most eight Single-Network Slice Selection Assistance Information (S-NSSAIs) in the Allowed and Requested NSSAIs portions in signaling messages exchanged between the UE device and the network.

Figure 1:
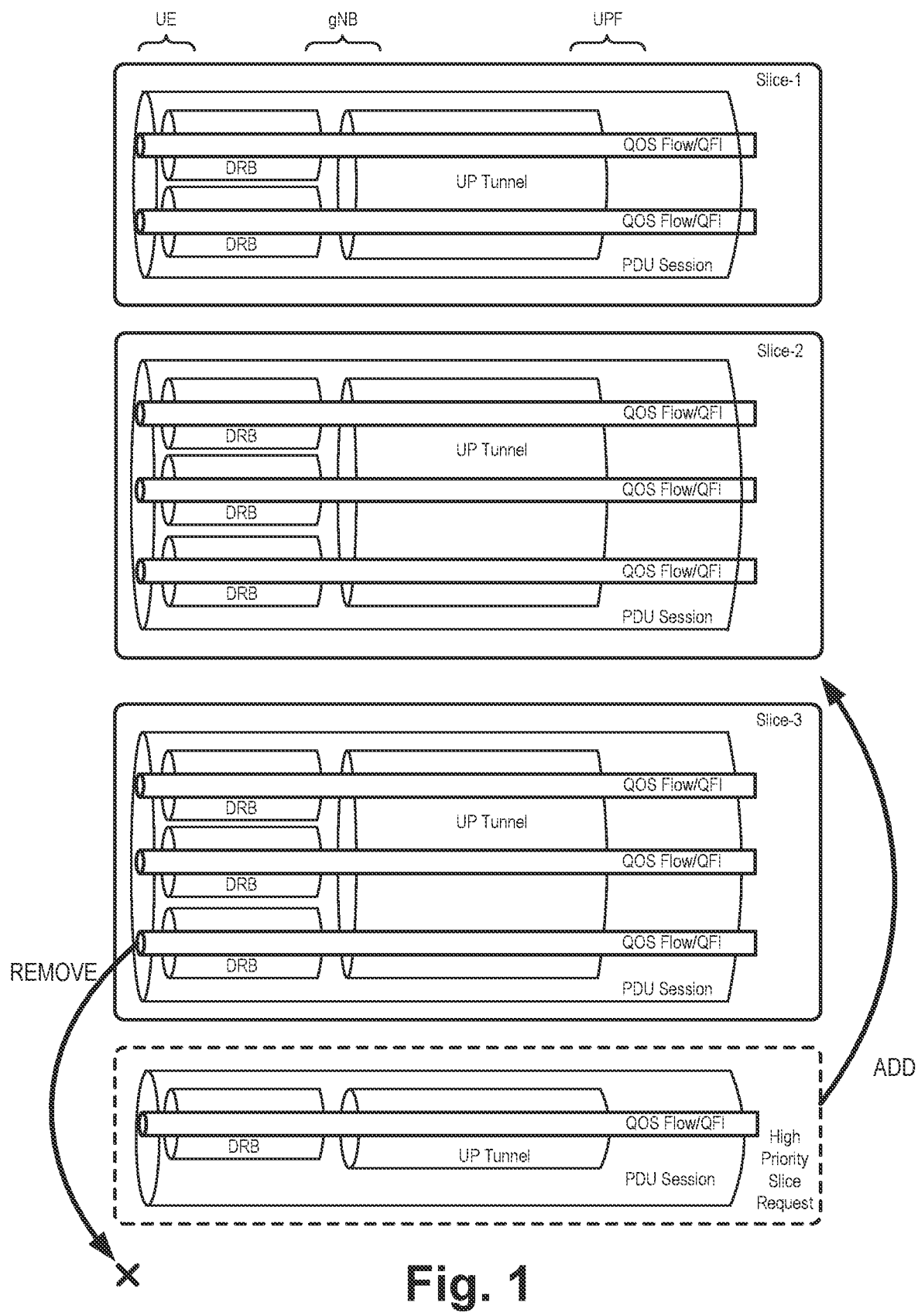
FIG. 1 illustrates concepts described herein.

FIG. 1 illustrates concepts described herein. A Protocol Data Unit (PDU) session is an association between a UE device and a Data Network that provides a PDU connectivity service. Quality of Service (QOS) rules and policies may be mapped to user plane (UP) packets of QOS flows between a UE device and a user plane function (UPF). As shown in FIG. 1, each of the QOS flows may be associated with a QOS Flow Identifier (QFI). A Data Radio Bearer (DRB) may transport one or more QOS flows between a UE device and an access station (e.g., a gNodeB) of an access network. A UP tunnel (e.g., a General Packet Radio Service Tunneling Protocol User Plane (GTP-U) tunnel) may carry a QOS flow between the access station and the UPF. There may be a one-to-many relationship between the GTP-U tunnel (using an N3 interface) and the DRBs (using an air interface).

A network slice may include one or multiple DRBs (up to the eight supported by the UE device). Thus, the UE device may support as few as one or up to eight network slices. A PDU session belongs to one and only one specific network slice instance per mobile network. Thus, different network slice instances may not share a PDU session, though different network slice instances may have slice-specific PDU sessions using the same data network name (DNN). In FIG. 1, a first network slice (Slice-1) uses two DRBs distributed among one PDU session, while a second network slice (Slice-2) and third network slice (Slice-3) each use three DRBs with one PDU session, respectively. Thus, as shown in FIG. 1, the UE device may exhaust its quota of available simultaneous DRBs when the number of DRBs reaches a maximum of eight.

Currently there is no mechanism for the UE device or network to handle scenarios when an application requires a new slice and the UE device has exhausted its quota of eight simultaneous DRBs. Thus, if an application on a UE device with eight active DRBs attempts to establish a new PDU session on a new slice, network access may be denied, regardless of the importance of the new PDU session relative to the other active PDU sessions. There is a need for UE devices and/or the mobile network to monitor the maximum number of simultaneous slices and the corresponding DRBs and prioritize application traffic. More particularly, UE devices and/or the supporting network need to be able to prioritize traffic of existing sessions and apply preemption when necessary to support UE device connections to higher priority slices. For example, referring to FIG. 1, an application may request a high priority slice (e.g., public safety, emergency preparedness, etc.) when all available DRBs for the UE device are being used for Slice-1, Slice-2, and Slice-3. A DRB/QOS flow of a lower priority slice (e.g., Slice-3) may be dropped to enable PDU session establishment on the higher priority slice for the requesting application.

Systems and methods described herein relate to management of the maximum number of simultaneous DRBs/QOS flows and prioritization of application traffic for UE devices. Such management of the maximum number of DRBs is herein referred to as a slice management and prioritization service. In one implementation, a UE device may monitor active DRBs/slices/PDU sessions and prioritize traffic when the UE device reaches its quota of eight simultaneous DRBs. In another implementation, the mobile network may monitor existing DRB utilization on a per-UE device basis and prioritize traffic when the UE device has reached its DRB limit.

According to one implementation, a network device in a core network may receive a notification that indicates a UE device has exhausted a quota of available simultaneous DRBs and, afterwards, receive an indication that an application on the UE device has requested a new PDU session on a specified network slice that is not currently active for the UE device. The network device may identify relative priorities for the specified network slice and active network slices for the UE device; determine, based on the relative priorities, if the new PDU session can preempt a DRB for an active PDU session; and delete the active PDU session when it is determined the new PDU session can preempt a DRB for the active PDU session.

Figure 2:
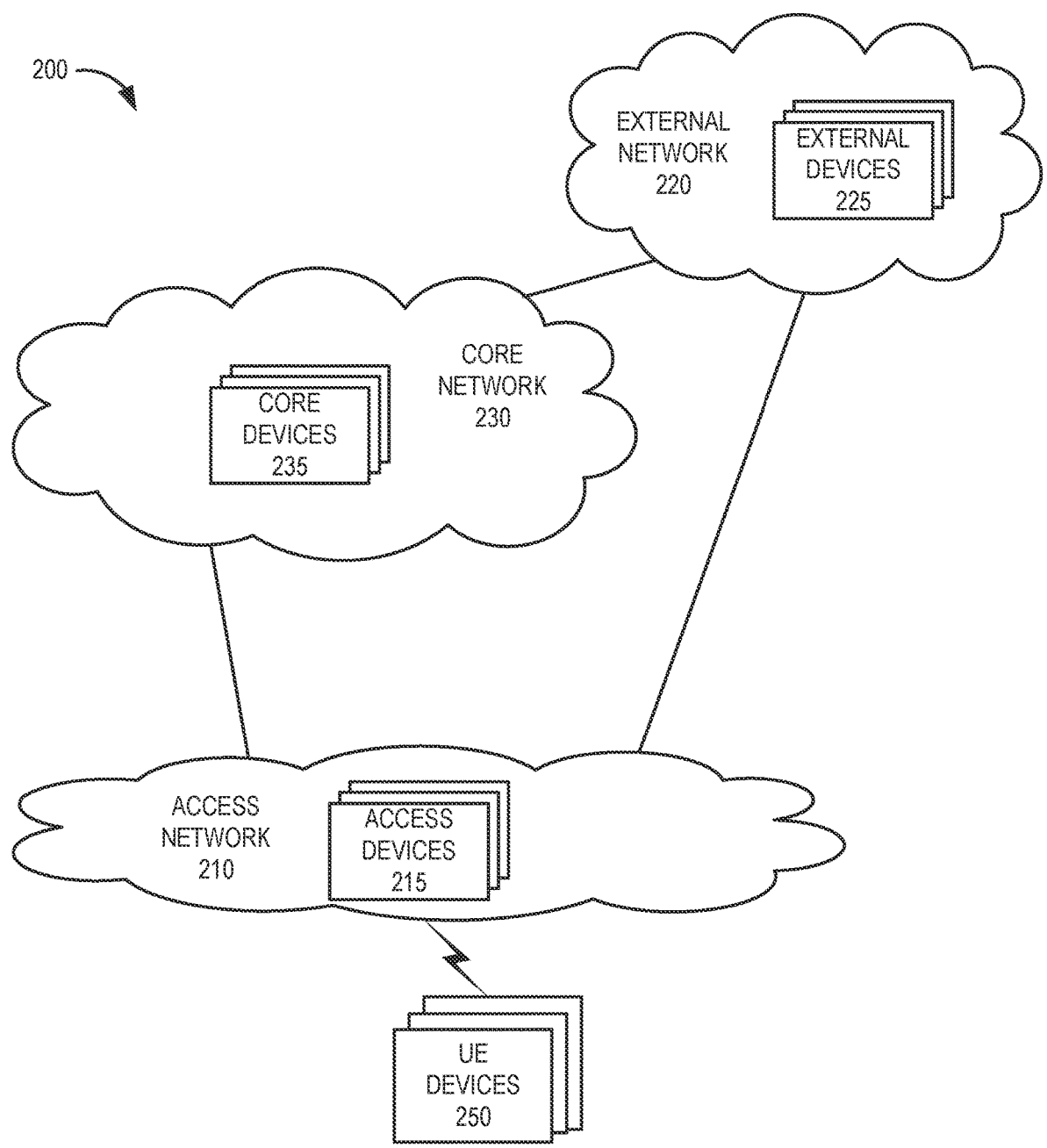
FIG. 2 is a diagram illustrating a network environment in which systems and methods described herein may be implemented.

FIG. 2 is a diagram illustrating an example environment 200 in which an embodiment of the slice management and prioritization service may be implemented. As illustrated, environment 200 includes an access network 210, an external network 220, and a core network 230. Access network 210 includes access devices 215 (also referred to individually or generally as access device 215). External network 220 includes external devices 225 (also referred to individually or generally as external device 225). Core network 230 includes core devices 235 (also referred to individually or generally as core device 235). Environment 200 further includes UE devices 250 (also referred to individually or generally as UE device 250).

The number, type, and arrangement of networks illustrated in environment 200 are examples. In other embodiments, environment 200 may include fewer networks, additional networks, and/or different networks. For example, in other embodiments, other networks not illustrated in FIG. 2 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

The number, the type, and the arrangement of network devices, and the number of UE devices 250 are examples. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 200 includes communication links between the networks, between the network devices, and between UE devices 250 and the network/network devices. Environment 200 may be implemented to include wired, optical, and/or wireless communication links. A connection via a communication link may be direct or indirect. For example, an indirect connection may involve an intermediary device and/or an intermediary network not illustrated in FIG. 2. A direct connection may not involve an intermediary device and/or an intermediary network. The number, type, and arrangement of communication links illustrated in environment 200 are examples.

Environment 200 may include various planes of communication including, for example, a control plane, a user plane, a service plane, and/or a network management plane. Environment 200 may include other types of planes of communication. Additionally, an interface of a network device may be modified (e.g., relative to an interface defined by a standards body, such as 3GPP, 3GPP2, ITU, ETSI, GSMA, or the like) or a new interface of the network device may be provided in order to support the communication (e.g., transmission and reception of messages, information elements (IE), attribute value pairs (AVPs), objects, parameters, or other form of information) between network devices and the slice management and prioritization service logic of the network device, as described herein. According to various implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 210 may include one or multiple networks of one or multiple types and technologies. For example, access network 210 may be implemented to include a 5G RAN, a future generation RAN (e.g., a sixth generation (6G) RAN, a seventh generation (7G) RAN, or a subsequent generation RAN). Access network 210 may also include a legacy RAN (e.g., a third generation (3G) RAN, a 4G or 4.5 RAN, etc.). Access network 210 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 210, external network 220, and/or core network 230.

Access network 210 may include different and multiple functional splitting, such as options 2, 2, 3, 4, 5, 6, 7, or 8 that relate to combinations of access network 210 and core network 230 including an evolved packet core (EPC) network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) new radio (NR), stand-alone (SA) NR, etc.).

According to some embodiments, access network 210 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various embodiments, access network 210 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, higher than mm wave), and/or other attributes or technologies used for radio communication. Additionally, or alternatively, according to some embodiments, access network 210 may be implemented to include various wired and/or optical architectures for wired and/or optical access services.

Depending on the implementation, access network 210 may include one or multiple types of network devices, such as access devices 215. For example, access device 215 may include a gNB, an evolved LTE (eLTE) evolved Node B (eNB), an eNB, a radio network controller (RNC), a remote radio head (RRH), a baseband unit (BBU), an RU, a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 215 may include a wired and/or optical device (e.g., modem, wired access point, optical access point, Ethernet device, etc.) that provides network access. According to some implementations, access device 215 may include a combined functionality of multiple RATs (e.g., 4G and 5G functionality, 5G and 5.5G functionality, 5G and 6G functionality, etc.) via soft and hard bonding based on demands and needs. According to some implementations, access device 215 may include an integrated functionality, such as a CU-CP and a CU-UP, or other integrations of split RAN nodes. Access device 215 may be an indoor device or an outdoor device. Access device 215 may include a controller device. For example, access device 215 may include a RAN Intelligent Controller (RIC).

According to various implementations, access device 215 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 215 may provide a wireless access service at a cell, a sector, a sub-sector, carrier, and/or other configurable level.

External network 220 may include one or multiple networks of one or multiple types and technologies. For example, external network 220 may be implemented to include a service or an application layer network, a cloud network, a private network, a public network, a multi-access edge computing (MEC) network, a fog network, the Internet, a packet data network (PDN), a service provider network, the world wide web, an Internet Protocol Multimedia Subsystem (IMS) network, a Rich Communication Service (RCS) network, an SDN, a virtual network, a data center, or other type of network that may provide access to and may host a UE device application, service, or asset (application service).

Depending on the implementation, external network 220 may include various network devices such as external devices 225. For example, external devices 225 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.).

External devices 225 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 230 may include one or multiple networks of one or multiple network types and technologies. Core network 230 may include a complementary network of access network 210. For example, core network 230 may be implemented to include an NGC network, an EPC of an LTE network, an LTE-Advanced (LTE-A) network, and/or an LTE-A Pro network, a future generation core network (e.g., a 5G, a 6G, a 7G, or beyond core network, etc.), and/or another type of core network.

Depending on the implementation, core network 230 may include various types of network devices that are illustrated in FIG. 2 as core devices 235. For example, core devices 235 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a GPRS support node (GGSN), a home subscriber server (HSS), an authentication, authorization, and accounting (AAA) server, a policy and charging rules function (PCRF), a policy and charging enforcement function (PCEF), and/or a charging system (CS). According to other implementations, core devices 235 may include additional, different, and/or fewer network devices than those described. For example, core devices 235 may include a non-standard or a proprietary network device, and/or another type of network device that may be well-known but not particularly mentioned herein. Core devices 235 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

According to an embodiment, at least a portion of core devices 235 may include slice management and prioritization service logic and an interface that supports the slice management and prioritization service, as described herein. According to some embodiments, other network devices of other types of networks (e.g., access network 210, external network 220, an X-haul network, or another type of network) may include slice management and prioritization service logic and an interface that supports the slice management and prioritization service, as described herein.

UE devices 250 include a device that may have computational and/or communication capabilities (e.g., wireless, wired, optical, etc.). UE device 250 may be implemented as a mobile device, a portable device, a stationary device (e.g., a non-mobile device and/or a non-portable device), a device operated by a user, or a device not operated by a user. For example, UE device 250 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, or other type of wireless device (e.g., other type of UE device). UE device 250 may be configured to execute various types of software (e.g., applications, programs, etc.). The number and the types of software may vary among UE devices 250.

UE device 250 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, UE device 250 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of UE device 250 may vary among UE devices 250.

For certain applications, UE device 250 may store UE Route Selection Policies (URSP). The URSP framework for a 5G System provides traffic steering rules for UE devices and enables a UE device to determine how a certain application should be handled in the context of traffic routing to an appropriate network slice. According to implementations described herein, URSP may include a preemption policy for network slices to enable device-side monitoring and prioritization for network slices. URSP may be stored, for example, in a subscriber identity module (SIM) or modem of UE device 250.

Figure 3:
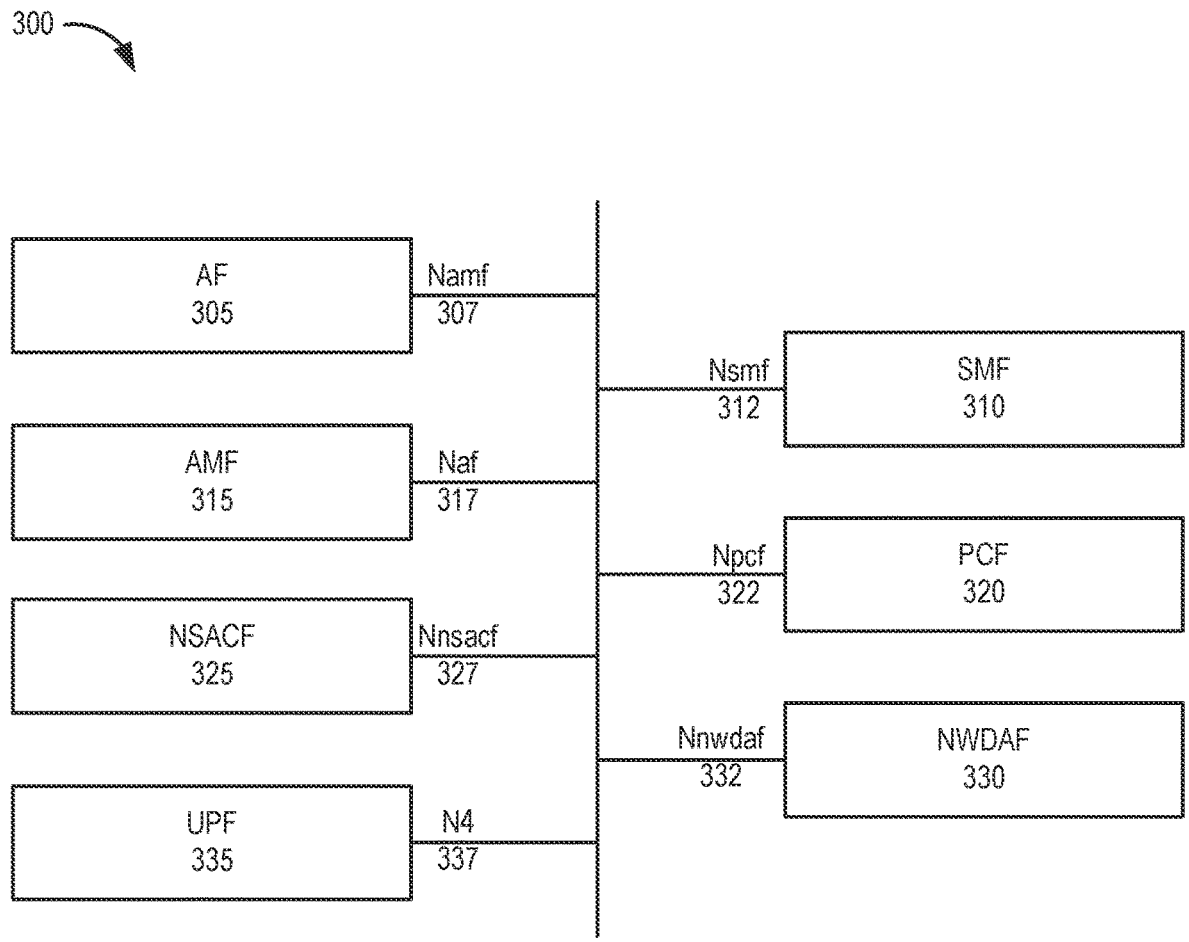
FIG. 3 is a diagram of example logical components of a core network, according to an implementation.

FIG. 3 is a diagram illustrating an exemplary environment 300 in which an exemplary embodiment of the slice management and prioritization service may be implemented. As illustrated, environment 300 may include an AF 305, an AMF 315, an SMF 310, a PCF 320, a Network Slice Admission Control Function (NSACF) 325, a NWDAF 330, and a UPF 335. AF 305, AMF 315, SMF 310, PCF 320, NSACF 325, NWDAF 330, and UPF 335 may be included in core network 120. Although one UPF 335. AMF 315, SMF 310, AF 305, PCF 320, NSACF 325, NWDAF 330, and UPF 335 are shown in FIG. 3, there may be multiple instances of one or more components related to a single UE device 250. For example, a single UE device 250 may have more than one network slice. Each UE device 250 may be served by a single AMF 315, but each slice may have its own SMF and UPF.

Additionally, AMF 315 may communicate via an Namf 307 interface, SMF 310 may communicate via an Nsmf 312 interface, and AF 305 may communicate via a Naf 317 interface, PCF 320 may communicate via an Npcf 322 interface, and NSACF 325 may communicate via an Nnsacf 327 interface, for example. While Namf, Nsmf, Naf, Npcf, Nnsacf, and Nnwdaf interfaces may align with nomenclature of a 3GPP service-based architecture in a control plane of a 5G core network, for example, slice management and prioritization service, as described herein, is not limited to such nomenclature and/or functionality. Additionally, according to some exemplary embodiments, Namf 307, Nsmf 312, Naf 317, Npcf 322, Nnsacf 327 and/or Nnwdaf 332 interfaces may operate according to some or all of the configurations and/or functionality defined by a standard (e.g., a 3GPP standard for a Namf interface, a 3GPP standard for an Nsmf interface, a standard for a Naf interface associated with a standardizing body other than 3GGP, and so forth), Namf 307, Nsmf 312, Naf 317, Npcf 322, Nnsacf 327 and/or Nnwdaf 332 may additionally operate according to an exemplary embodiment of the slice management and prioritization service, which has not been defined by any standard, for example. Furthermore, the interfaces of AMF 315, SMF 310, AF 305, PCF 320, NSACF 325, NWDAF 330 and UPF 335 according to various implementations, are not limited to service-based interfaces, as mentioned above. For example, SMF 310 and a UPF (not shown) may be implemented to include an N4 interface that supports an embodiment of the slice management and prioritization service.

AF 305 may provide services associated with a particular application, such as, for example, gaming applications, applications influencing on traffic routing, interacting with a policy framework for policy control, and/or other types of applications.

SMF 310 may perform session establishment, modification and/or release; perform IP address allocation and management; perform Dynamic Host Configuration Protocol (DHCP) functions; perform selection and control of a UPF; configure traffic steering at a UPF to guide traffic to the correct destination; terminate interfaces toward PCF 320; perform lawful intercepts; charge data collection; support charging interfaces; control and coordinate charging data collection; terminate session management parts of Non-Access Stratum (NAS) messages; perform downlink data notification; manage roaming functionality; and/or perform other types of control plane processes for managing user plane data. SMF 310

AMF 315 may perform registration management, connection management, reachability management, mobility management, lawful intercepts, Short Message Service (SMS) transport between UE device 250 and an SMS function, session management message transport between UE device 250 and SMF 310, access authentication and authorization, location services management, support of non-3GPP access networks, and/or other types of management processes. AMF 315 may page UE device 250 based on mobility category information associated with UE device 250 obtained from a Unified Data Management (UDM) function.

PCF 320 may support policies to control network behavior, provide policy rules to control plane functions (e.g., to an SMF 310), access subscription information relevant to policy decisions, perform policy decisions, and/or perform other types of processes associated with policy enforcement. According to an implementation described herein, PCF 320 may forward URSP updates toward UE devices 250 to reflect slice prioritization and preemption values. In another implementation, PCF 320 may instruct AMF 315 and/or UPF 335 to send notification messages to trigger slice preemption when a UE device 250 has exhausted its quota of eight simultaneous DRBs.

NSACF 325 may apply admission control policies with respect to network slices to limit the number of user devices registered per slice or the number of active PDU sessions per slice. NWDAF 330 may collect analytics information associated with access network 210 and/or core network 230. NWDAF 330 may obtain data (e.g., statistics, metric values, events, etc.) from such devices/networks and may provide data analytics functions that may be configured by a network operator, for example.

UPF 335 may maintain an anchor point for intra/inter-RAT mobility, maintain an external PDU point of interconnect to a particular external network 220, perform packet routing and forwarding, perform the user plane part of policy rule enforcement, perform packet inspection, perform lawful intercept, perform traffic usage reporting, perform quality of service (QoS) handling in the user plane, perform uplink traffic verification, perform transport level packet marking, perform downlink packet buffering, forward an "end marker" to a access network 210 node, and/or perform other types of user plane processes.

According to implementations described herein, each of SMF 310, AF 305, PCF 320, NSACF 325, NWDAF 330 may support a new data type (e.g., a DRB max data type) to report the total number of DRBs, PDU Sessions, and/or slices utilized per UE device. As described further herein, PCF 320 may subscribe to receive the DRB max data type from one or more of SMF 310, AF 305, PCF 320, NSACF 325, and NWDAF 330. SMF 310, AF 305, PCF 320, NSACF 325, and NWDAF 330 may provide the DRB max data type, for example, to PCF 320 when a UE device 250 has exhausted its quota of eight simultaneous DRBs or when UE device 250 has drops back below the quota of DRBs.

Figure 4:
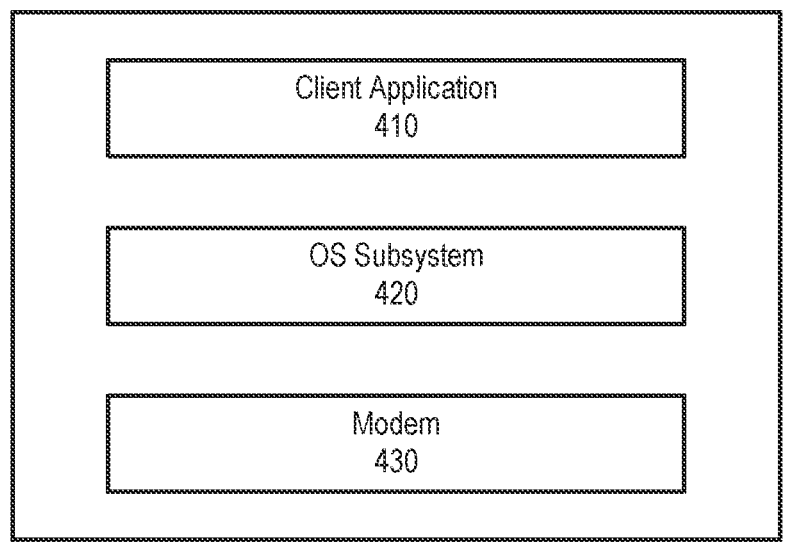
FIG. 4 is a diagram illustrating example logical components of user equipment (UE) device, according to an implementation.

FIG. 4 is a block diagram illustrating logical components of UE device 250 for supporting the slice management and prioritization service, according to implementations described herein. As shown in FIG. 4, UE device 250 may include client application 410, an OS subsystem 420, and a modem 430.

According to an embodiment, client application 410 may include logic that provides a service pertaining to a software application. For example, client application 410 may provide a streaming service, gaming service, shopping service, social media service, etc., for a user of UE device 250. Client application 410 may typically include or be associated with (e.g., based on configuration settings or an application server request) a traffic descriptor value to indicate a required QOS, etc.

OS subsystem 420 may establish a connection between client application 410 and modem 430. OS subsystem 420 may communicate, for example, traffic descriptor values for client application 410 to modem 430. In some implementations, OS subsystem 420 may also provide a governance function to confirm that a client application 410 is authorized for the new traffic descriptor value.

Modem 430 may include, for example, a 5G/NR modem that performs processing, modulation, demodulation, and/or other signal processing for 5G/NR communications of UE device 250. Modem 430 may store URSP rules and/or access the URSP rules from a SIM, a SIM-like device, or another secure element (not shown) of UE device 250. According to implementations described herein, modem 430 may receive URSP rules, from core network 230 (e.g., one of core devices 235), that include a preemption policy for network slices to enable device-side monitoring and prioritization for network slices. In one implementation, modem 430 may receive a traffic descriptor value from OS subsystem 420, associate the traffic descriptor value with a network slice, and apply URSP rules to set up a PDU session for client application 410.

FIG. 5 is a table 500 illustrating a preemption policy that may be incorporated into URSP rules and implemented by a UE device 250. According to an implementation, table 500 (or information corresponding thereto) may be stored in a memory of UE device 250. As illustrated in FIG. 5, table 500 may include a UE requested slices field 510, a UE allowed slices field 515, a slice priority field 520, and a preemption settings field 525. As further illustrated, table 500 includes entries 590 that each includes a grouping of fields 510-525 that are correlated (e.g., a record, etc.).

UE requested slices field 510 may identify a slice (e.g., a slice identifier) that has been requested by UE device 250. UE allowed slices field 515 may identify a slice (e.g., a slice identifier) that has been allowed (e.g., active) for UE device 250. Slice priority field 520 may indicate a slice priority, indicating, for example, a ranked priority level (e.g., 1 to 8) for a corresponding type of network slice. For example, highest priority may be reserved for network slices handling emergency communications, while lowest priority may be reserved for network slices carrying best effort traffic.

Preemption settings field 525 may include one or more setting to indicate preemption characteristics for a particular slice. Preemption characteristics may include a preemption vulnerability setting to indicate whether the network slice is eligible for preemption consideration (e.g., Yes or No). Preemption characteristics may also include a preemption capable setting to indicate whether the network slice is eligible to preempt other slices (e.g., Yes or No). Preemption characteristics may also include a preemption priority setting to indicate a priority for preemption consideration. For example, the preemption priority setting may include a ranking of relative availability of the network slice to be preempted (e.g., a ranking from 1 to 8, where 8 is the least likely to be preempted). According to an implementation, the preemption priority settings may correspond to allocation and retention priority (ARP) levels that define the relative importance of a resource request when deciding whether new service data flows may be accepted or needs to be rejected in the case of resource limitations. The ARP preemption capability defines whether a service data flow may get resources that were already assigned to another service data flow with a lower ARP level. The ARP preemption vulnerability defines whether a service data flow may lose the resources assigned to it in order to admit a service data flow with higher ARP level.

FIG. 6 is a diagram illustrating communications in a portion 600 of network environment 100 to perform network monitoring and prioritization for UE device slice usage. As shown in FIG. 6, network portion 600 may include UE device 250, SMF 310, AMF 315, PCF 320, and network functions (NFs) 610. NFs 610 may correspond to one or more core devices 235, such as SMF 310, AMF 315, NSACF 325, and/or NWDAF 330. FIG. 6 provides simplified illustrations of communications in network portion 600 and is not intended to reflect every signal or communication exchanged between devices/functions.

UE device 250 may be served by a single AMF 315; but each network slice has its own SMF 310 and UPF (not shown in FIG. 6). In FIG. 6, assume SMF 310 corresponds to an SMF serving UE device 250 for an active, pre-emptible network slice.

Communications in FIG. 6 illustrate use of a new data type, herein referred to as a DRB max data type, to manage slice preemption policies for each UE device 250. As shown in FIG. 6, using XXEventsSubscription 620 (where "XX" may be any of SMF, AMF, NSACF, or NWDAF), PCF 320 may subscribe to a DRB max data type, where a NF 610 may provide a DRB/PDUsession/slice utilization report per UE device. The respective NF 610 (e.g., SMF 310, AMF 315, NSACF 325, and/or NWDAF 330) may confirm the subscription with a XXEventsSubscription_Response 622, for example. NF 610 may then monitor the total DRB/PDU session/slice utilization per UE device 250 and inform PCF 320 when the UE device 250 has eight active DRB/PDU sessions/slices simultaneously. For example, NF 610 may use XXEventsSubscription_Notification 624 to inform PCF 320 that UE device 250 is at the DRB/PDU session/slice limit. Similarly, NF 610 may use another XXEventsSubscription_Notification message (not shown) to inform PCF 320 when UE device 250 drops back below the DRB/PDU session/slice limit.

At some time after PCF 320 receives XXEventsSubscription_Notification 624, PCF 320 may receive guidance (e.g., from AF 305) to use a network slice for UE device 250 which is unique/additional to the already established slices indicated by XXEventsSubscription_Notification 624. As indicated at reference 626, PCF 320 may check the UE device 250 subscription data (e.g., for specific network slice eligibility) and local policy to determine the URSP rules to send to UE device 250.

PCF 320 (or a session management (SM) PCF) may check for applicable preemption policies and, additionally, what are the allowed triggers on per UE device level. The SM PCF may send toward UE device 250 the priority values associated with slices, such as those illustrated in table 500. The priority values may include information about the priority level, the preemption capability, and the preemption vulnerability for the network slices. UE device 250 may use the priority values when maximum number of slices is reached and a new slice needs to be accessed.

SMF 310 may receive the updated URSP (e.g., Npcf_SM-PolicyControl_Update 628) sent by PCF and may send a signal to disable an active QOS flow or PDU session. For example, SMF 310 may provide instructions to AMF 315 to delete a low priority pre-emptible QOS flow/DRB with an indicated preemption cause. For example, SMF 310 may provide to AMF 315 URSP rules with instructions 630 to delete a PDU session(s) of a lowest priority slice with a cause indicated as "pre-emption or preempted due to max DRB limit exceeded." AMF 315 may forward the updated URSP rules with the delete PDU session instructions to UE device 250, as indicated at reference 632.

UE device 250 may receive the URSP rules and update the URSP rules in a local memory, as indicated by reference 634. Based on the updated URSP rules, UE device 250 may replace the preempted PDU session/DRB with the requested session established on the higher priority slice, as indicated at reference 636.

Figure 7:
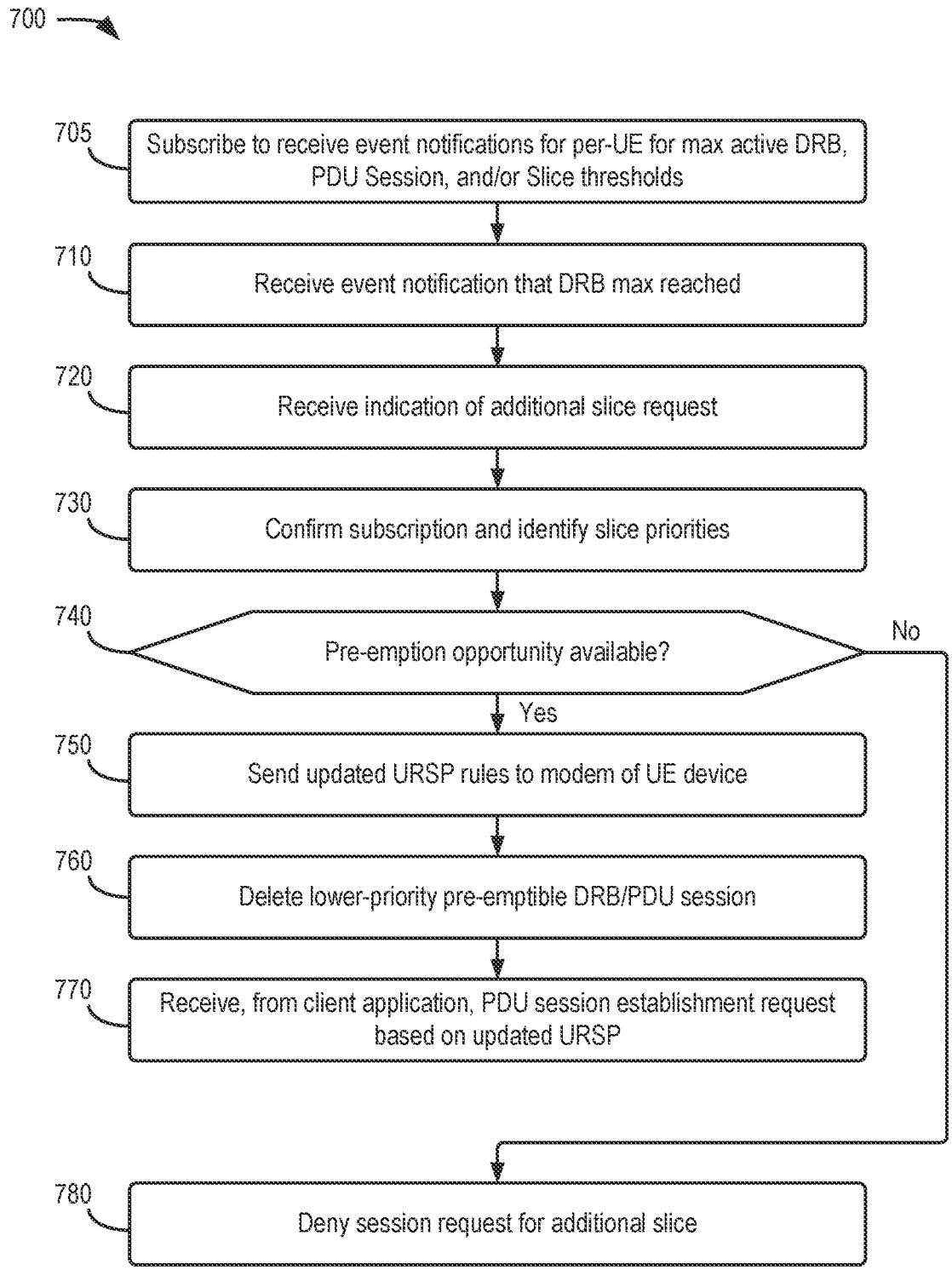
FIGS. 7 and 8 are flow diagrams illustrating exemplary processes for providing a slice management and prioritization service, according to implementations described herein.

FIG. 7 is a flow diagram illustrating an exemplary process 700 for providing a slice management and prioritization service, according to implementations described herein. In one implementation, process 700 may be implemented by one or more core devices 235, such as PCF 320, AMF 315, and SMF 310. In another implementation, process 700 may be implemented by one or more core devices 235 in conjunction with UE device 250.

Process 700 may include subscribing to receive event notifications for per UE max active DRB, PDU Session, and/or Slice thresholds (block 705) and receiving an event notification that a max DRB threshold is reached (block 710). For example, for a connected UE device 250, PCF 320 may subscribe to a DRB max data type from one or more of AMF 315, SMF 310, NSACF 325, and NWDAF 330 (e.g., using XXEventsSubscription message 620). As a consequence of the subscription, PCF 320 may receive an event notification (e.g., XXEventsSubscription_Notification 624) that UE device 250 has exhausted its quota of eight simultaneous DRBs.

Process 700 may also include receiving an indication of an additional slice request (block 720), confirming a subscription and identifying URSP rules for the UE device (block 730), and determining if a pre-emption opportunity is available (block 740). For example, at a time when UE device has eight simultaneous DRBs, an application may seek to establish a PDU session on a different network slice than is currently used by UE device 250. PCF 320 may confirm if the user subscription supports the requested network slice, identify slice priorities for the active slices, and determine if network slice priorities for UE device 250 permit preemption by the newly requested slice.

If a pre-emption opportunity is available (block 740—Yes), process 700 may include sending updated URSP rules via SMF 310 to a modem of the UE device (block 750), deleting a lower-priority pre-emptible PDU session/DRB (block 760), and receiving, from client application, a PDU session establishment request based on the updated URSP (block 770). For example, PCF 320 may send to SMF 310 an updated policy (e.g., consistent with URSP rules), which may be applied by SMF 310 to delete a low priority pre-emptible PDU session/DRB. UE device 250 may receive the updated URSP rules and use the ARP values to establish a PDU session for a newly requested slice.

If a pre-emption opportunity is not available (block 740—No), process 700 may include denying the session request (block 780). For example, if the network slice to support a requested new PDU session does not have priority over any of the existing network slices (based on the URSP rules), the session request may be denied.

Figure 8:
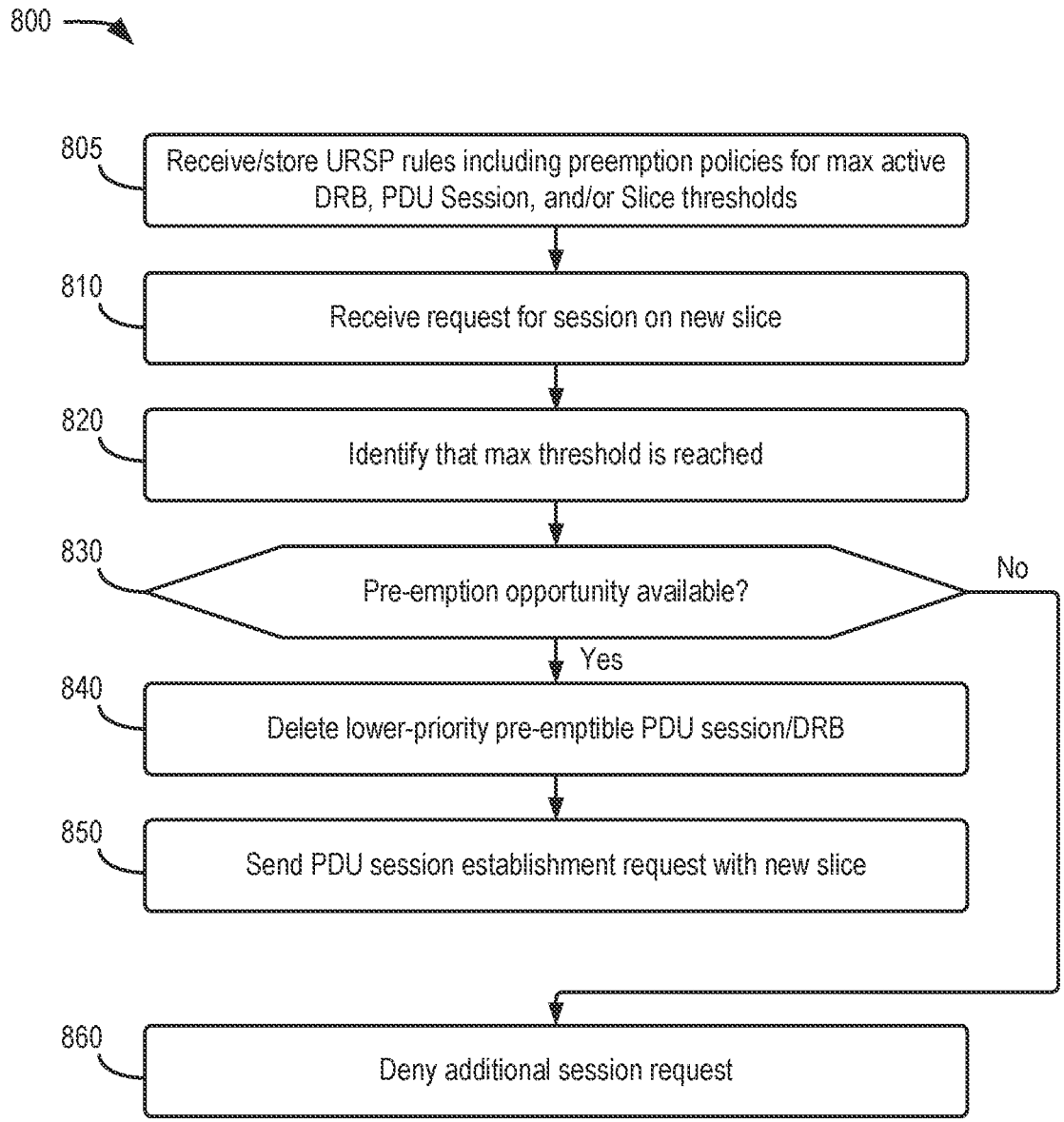

FIG. 8 is a flow diagram illustrating an exemplary process 800 for providing a slice management and prioritization service, according to another implementation described herein. In one implementation, process 800 may be implemented by UE device 250. In another implementation, process 800 may be implemented by UE device 250 in conjunction with one or more core devices 235, such as PCF 320, AMF 315, and SMF 310.

Process 800 may include receiving and storing URSP rules governing per-UE max active DRB, PDU Session, and/or Slice thresholds (block 805) and receiving a session request for a new network slice (block 810). For example, UE device 250 may receive URSP rules from a core device 235. The URSP rules may include information about the priority level, the preemption capability, and the preemption vulnerability for network slices available to UE device 250. At some point after storing the URSP rules, a client application on UE device 250 may request a new session based on user input (e.g., selecting the application).

Process 800 may further include determining that a max DRB threshold is reached (block 820) and determining if a preemption opportunity is available (block 830). For example, UE device 250 may identify that UE device 250 has exhausted its quota of eight simultaneous DRBs. UE device 250 may apply the stored URSP rules to determine if one of the active slices supporting the DRB can be preempted.

If a preemption opportunity is available (block 830—Yes), process 800 may include deleting a lower-priority pre-emptible DRB or PDU session (block 840) and sending a PDU session establishment request for the application on the new slice (block 850). For example, UE device 250 may apply the URSP rules to delete a low priority pre-emptible PDU session/DRB. UE device 250 may receive the updated URSP rules and use the ARP values to establish a PDU session for a newly requested slice.

If a pre-emption opportunity is not available (block 830—No), process 800 may include denying the session request (block 860). For example, if the network slice to support the requested new PDU session does not have priority over any of the existing network slices (based on the URSP rules), UE device 250 will deny the client application's session request.

Figure 9:
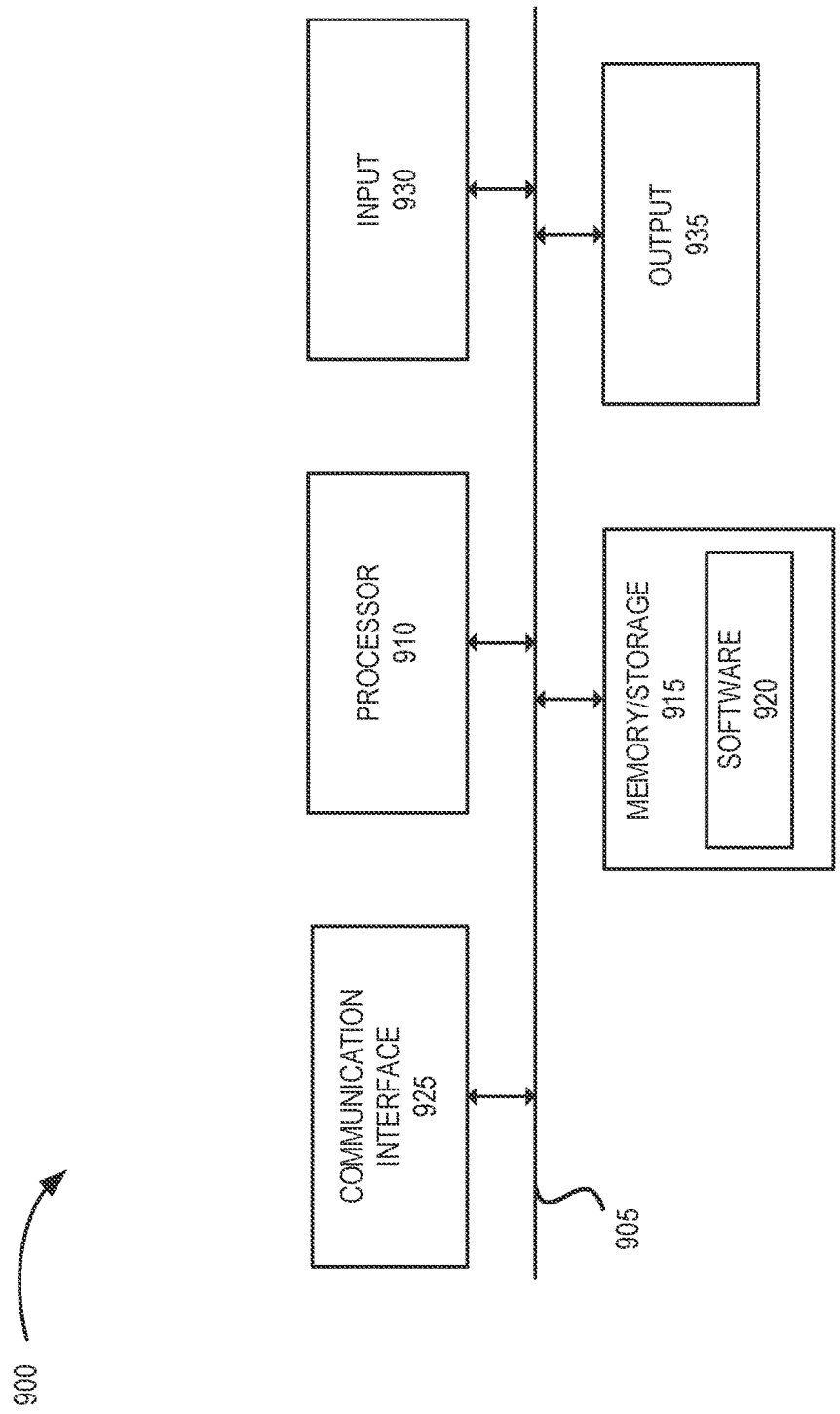
FIG. 9 illustrates example components of a device according to an implementation.

FIG. 9 illustrates example components of a device 900 according to an implementation described herein. Components of UE device 250, AF 305, SMF 310, AMF 315, PCF 320, NSACF 325, NWDAF 330, UPF 335, and other network devices in environment 200 may each include or be implemented on one or more devices 900. Device 900 may include a bus 905, a processor 910, a memory/storage 915 that stores software 920, a communication interface 925, an input 930, and an output 935. According to other embodiments, device 900 may include fewer components, additional components, different components, and/or a different arrangement of components than those illustrated in FIG. 9 and described herein.

Bus 905 includes a path that permits communication among the components of device 900. Processor 910 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 910 may be implemented as hardware (e.g., a microprocessor, etc.), a combination of hardware and software (e.g., a SoC, an ASIC, etc.), may include one or multiple memories (e.g., cache, etc.), etc.

Processor 910 may control the overall operation, or a portion of operation(s) performed by device 900. Processor 910 may perform one or multiple operations based on an operating system and/or various applications or computer programs (e.g., software 920). Processor 910 may access instructions from memory/storage 915, from other components of device 900, and/or from a source external to device 900 (e.g., a network, another device, etc.).

Memory/storage 915 includes one or multiple memories and/or one or multiple other types of storage mediums. Memory/storage 915 may store data, software, and/or instructions related to the operation of device 900. Software 920 includes an application or a program that provides a function and/or a process. Software 920 may also include firmware, middleware, microcode, hardware description language (HDL), and/or other form of instruction. Software 920 may also be virtualized. Software 920 may further include an operating system (OS) (e.g., Windows, Linux, Android, proprietary, etc.).

Communication interface 925 permits device 900 to communicate with other devices, networks, systems, and/or the like. Communication interface 925 includes one or multiple wireless interfaces and/or wired interfaces. For example, communication interface 925 may include one or multiple transmitters and receivers, or transceivers. Communication interface 925 may operate according to a protocol stack and a communication standard. Communication interface 925 may include an antenna. Communication interface 925 may include various processing logic or circuitry (e.g., multiplexing/de-multiplexing, filtering, amplifying, converting, error correction, application programming interface (API), etc.). Communication interface 925 may be implemented as a point-to-point interface, a service-based interface, or a reference interface, for example. Input 930 permits an input into device 900. Output 935 permits an output from device 900.

As previously described, a network device may be implemented according to various computing architectures (e.g., in a cloud, etc.) and according to various network architectures (e.g., a virtualized function, etc.). Device 900 may be implemented in the same manner. For example, device 900 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., data network 140) and/or another type of network (e.g., access network 120, core network 130, etc.). Thus, network functions described herein may be implemented as device 900.

Device 900 may perform a process and/or a function, as described herein, in response to processor 910 executing software 920 stored by memory/storage 915. By way of example, instructions may be read into memory/storage 915 from another memory/storage 915 (not shown) or read from another device (not shown) via communication interface 925. The instructions stored by memory/storage 915 may cause processor 910 to perform a function or a process described herein. Alternatively, for example, according to other implementations, device 900 performs a function or a process described herein based on the execution of hardware (processor 910, etc.).

Systems and methods described herein provide a slice management and prioritization service on a per UE device level. A network device in a core network may receive a notification that a UE device has exhausted a quota of available simultaneous DRBs and, afterwards, receive an indication that an application on the UE device has requested a new PDU session on a requested network slice that is not currently active for the UE device. The network device may identify relative priorities for the requested network slice and active network slices for the UE device; determine, based on the relative priorities, if the new PDU session can preempt a DRB for an active PDU session; and delete the active PDU session when it is determined the new PDU session can preempt a DRB for an active PDU session.

The foregoing description of implementations provides illustration and description, but is not intended to be exhaustive or to limit the invention to the precise form disclosed. Modifications and variations are possible in light of the above teachings or may be acquired from practice of the invention. Also, while a series of blocks have been described with regard to FIGS. 5-8, the order of the blocks and message/operation flows may be modified in other embodiments. Further, non-dependent blocks may be performed in parallel. In addition, while particular menu icons (e.g., icons 406 and 408) have been illustrated, it should be understood that other icons may be used to solicit input for premium or non-premium network services.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving, by a network device, a notification, from a device in a core network, that a user equipment (UE) device has exhausted a quota of available simultaneous data radio bearers (DRBs), wherein the notification includes a total number of DRBs, protocol data unit (PDU) sessions, and network slices utilized per UE device when the UE device has exhausted the quota of available simultaneous DRBs;
receiving, by the network device, an indication that an application on the UE device has requested a new PDU session on a requested network slice that is not currently active for the UE device;
identifying, by the network device, relative priorities for the requested network slice and active network slices for the UE device;
determining, by the network device and based on the relative priorities, if the new PDU session can preempt a DRB for an active PDU session; and
deleting, by the network device, the active PDU session when the new PDU session can preempt a DRB for an active PDU session.

2. The method of claim 1, further comprising:
subscribing to a notification service, for a data type, that reports a total number of DRBs, PDU sessions, and network slices utilized per UE device.

3. The method of claim 1, wherein, the quota of available simultaneous DRBs includes eight DRBs.

4. The method of claim 1, further comprising:
confirming, by the network device and prior to identifying the relative priorities, that the UE device has a subscription for the requested network slice.

5. The method of claim 1, wherein determining if a new PDU session can preempt includes:
identifying a preemption vulnerability indicator for one of the active network slices and identifying a preemption capability indicator for the requested network slice.

6. The method of claim 1, wherein determining if a new PDU session can preempt includes:
identifying a preemption priority value for the one of the active network slices.

7. The method of claim 1, further comprising:
initiating, by the network device, the new PDU session on the requested network slice when the new PDU session can preempt a DRB for an active PDU session.

8. The method of claim 1, wherein the network device includes a policy control function (PCF).

9. The method of claim 1, wherein receiving the notification, from the device in a core network, includes receiving the notification from one or more of:
a network data analytics function (NWDAF),
a Network Slice Admission Control Function (NSACF),
a session management function (SMF), or
an access and mobility management function (AMF).

10. A system, comprising:
one or more network devices configured to:
receive a notification, from a device in a core network, that a user equipment (UE) device has exhausted a quota of available simultaneous data radio bearers (DRBs), wherein the notification includes a total number of DRBs, protocol data unit (PDU) sessions, and network slices utilized per UE device when the UE device has exhausted the quota of available simultaneous DRBs;
receive an indication that an application on the UE device has requested a new PDU session on a requested network slice that is not currently active for the UE device;
identify relative priorities for the requested network slice and active network slices for the UE device;
determine, based on the relative priorities, if the new PDU session can preempt a DRB for an active PDU session; and
delete the active PDU session when the new PDU session can preempt a DRB for an active PDU session.

11. The system of claim 10, wherein the one or more network devices are further configured to:
subscribe to a notification service, for a data type, that reports a total number of DRBs, PDU sessions, and network slices utilized per UE device.

12. The system of claim 10, wherein, when receiving the notification, from the device in a core network, the one or more network devices are further configured to:
receive, the notification from one or more of a network data analytics function (NWDAF), a Network Slice Admission Control Function (NSACF), a session management function (SMF), or an access and mobility management function (AMF).

13. The system of claim 10, wherein the one or more network devices are further configured to:
confirm, prior to identifying the relative priorities, that the UE device has a subscription for the requested network slice.

14. The system of claim 10, wherein, when determining if a new PDU session can preempt, the one or more network devices are further configured to:
identify a preemption vulnerability indicator for one of the active network slices, and
identify a preemption capability indicator for the requested network slice.

15. The system of claim 10, wherein, when determining if a new PDU session can preempt, the one or more network devices are further configured to:
identify a preemption priority values for the active network slices.

16. The system of claim 10, wherein the one or more network devices are further configured to:
initiate the new PDU session on the requested network slice when the new PDU session can preempt a DRB for an active PDU session.

17. The system of claim 10, wherein the one or more network devices include a policy control function (PCF).

18. A non-transitory, computer-readable storage media storing instructions, which, when executed by one or more processors of a network device, cause the network device to:
receive a notification, from a device in a core network, that a user equipment (UE) device has exhausted a quota of available simultaneous data radio bearers (DRBs), wherein the notification includes a total number of DRBs, protocol data unit (PDU) sessions, and network slices utilized per UE device when the UE device has exhausted the quota of available simultaneous DRBs;
receive an indication that an application on the UE device has requested a new PDU session on a requested network slice that is not currently active for the UE device;
identify relative priorities for the requested network slice and active network slices for the UE device;
determine, based on the relative priorities, if the new PDU session can preempt a DRB for an active PDU session; and
delete the active PDU session when the new PDU session can preempt a DRB for an active PDU session.

19. The non-transitory, computer-readable storage media of claim 18, further comprising instructions to cause the network device to:
initiate the new PDU session on the requested network slice when the new PDU session can preempt a DRB for an active PDU session.

20. The non-transitory, computer-readable storage media of claim 18, further comprising instructions to cause the network device to:
subscribe to a notification service, for a data type, that reports a total number of DRBs, PDU sessions, and network slices utilized per UE device, and
receive, from a device in a core network, the data type when the UE device has exhausted the quota of available simultaneous DRBs.

* * * * *